US006546063B1

(12) United States Patent
Lee et al.

(10) Patent No.: US 6,546,063 B1
(45) Date of Patent: Apr. 8, 2003

(54) ASYNCHRONOUS CLOCK FOR ADAPTIVE EQUALIZATION

(75) Inventors: Kathleen Otis Lee, Sudbury, MA (US); Robert Henry Leonowich, Muhlenberg Township, PA (US); Ayal Shoval, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/021,329

(22) Filed: Feb. 10, 1998

(51) Int. Cl.[7] .......................... H04L 25/08; H03D 1/04; H03D 1/06; H03K 5/01; H03K 6/04
(52) U.S. Cl. ...................... 375/346; 375/232; 375/319; 375/34 J
(58) Field of Search ................ 375/346, 319, 375/229, 232, 355, 377, 345

(56) References Cited

U.S. PATENT DOCUMENTS

| | | | | |
|---|---|---|---|---|
| 4,577,159 A | * | 3/1986 | Pace | |
| 4,635,276 A | | 1/1987 | Karabinis | 375/15 |
| 4,703,282 A | | 10/1987 | Yoshida | 329/50 |
| 4,899,366 A | * | 2/1990 | Davis et al. | |
| 5,150,383 A | | 9/1992 | Misaizu et al. | 375/94 |
| 5,293,369 A | * | 3/1994 | Melas et al. | |
| 5,323,423 A | | 6/1994 | Townsend et al. | |
| 5,406,592 A | | 4/1995 | Baumert | 375/376 |
| 5,500,874 A | * | 3/1996 | Terrell | 375/232 |
| 5,590,154 A | * | 12/1996 | Forni et al. | 375/229 |
| 5,617,450 A | * | 4/1997 | Kakuishi et al. | 375/230 |
| 5,796,778 A | * | 8/1998 | Kurker | 375/229 |
| 5,914,986 A | * | 6/1999 | Ohta et al. | 375/328 |
| 6,118,815 A | | 9/2000 | Hirth et al. | |
| 6,307,900 B1 | * | 10/2001 | Choi et al. | 375/341 |

OTHER PUBLICATIONS

"A Direct Equalization Method" by Walter Y. Chen; 1997 IEEE; pp. 2505–2508.
"Asynchronous Adaptive Equalizatoin in Voiceband Data Modems" by Biswa R. Ghosh and David G. Messerschmitt; 1992 IEEE; pp. IV–485–IV–488.
"An Adaptive Cable Equalizer for Serial Digital Video Rates to 400MB/S" 1996 IEEE; pp. 174–175, 439.

* cited by examiner

*Primary Examiner*—Jean Corrielus

(57) ABSTRACT

A data receiver equalization technique utilizes a receiver clock that has a frequency different that the incoming data frequency (i.e., an "asynchronous clock") to asynchronously sample the incoming data waveform. The resulting information about the data, typically including the rise and/or fall times, overshoot and/or undershoot, and amplitude, may be used to equalize a data channel. Other adjustments to the receiver, including the gain level and DC offset compensation, may also be made using the resulting information. An illustrative embodiment using clocked comparators, continuous-time comparators, and a statistical analysis circuit is shown.

17 Claims, 3 Drawing Sheets

US 6,546,063 B1

ASYNCHRONOUS CLOCK FOR ADAPTIVE EQUALIZATION

BACKGROUND OF THE INVENTION

1. Field of the Invention

The present invention relates to a technique for adaptive equalization.

2. Description of Prior Art

Local area network (LAN) transceivers often utilize adaptive equalization in the receivers. For example, 100Base-TX receivers typically employ this technique, in order to restore the shape of the received data pulses that are distorted due to phase shifts introduced by the cable that connects the transceivers. This is because the twisted pair wiring typically used in local area networks (LANs) can introduce severe magnitude and phase distortion in the received data. The amount of distortion depends on the cable distance, which is not known at the time of product design. For this reason, LAN transceiver products (e. g., 100Base TX, ATM and 100BaseT transceivers) frequently employ adaptive equalizers in the receiver. Unfortunately, current LAN data rates are now so high that many well-researched adaptation techniques are becoming difficult or even impossible to implement in low-cost integrated circuits (ICs), which are typically implemented in CMOS technology.

The prior art includes several basic methods for adaptive equalization. The first method assumes that sufficient statistics for controlling adaptation can be obtained from the output of relatively simple analog or digital circuits. Most commonly, in a first implementation, the output of a peak or power detector may be used to estimate cable length; that is, a low amplitude implies a long cable length, while high amplitude implies a short cable. Another common implementation compares the outputs of two or more bandpass filters, and uses that as a cable length estimator. The first of these implementations requires sampling with an analog circuit, or else with an analog-to-digital converter with sufficient precision to determine the amplitude of the received signal (e.g., 6 bit accuracy). However, even then, this first implementation is inherently inaccurate in the presence of other channel degradations, such as variable loss and transmit amplitude uncertainty. The second of these implementations is affected as well by the large variation in effective channel bandwidth that is allowed by all the recent LAN standards. Implementations that utilize analog circuitry suffer further inaccuracies due to circuit imperfections. For instance, it is difficult to implement very fast peak detectors in CMOS integrated circuit technology. Furthermore, digital implementations are degraded by quantization noise in the analog-to-digital (A/D) converter, and/or the fact that practical limitations on the amount of oversampling may make it difficult and costly to implement highly selective filters, measure rise time accurately etc. Any of these techniques requires sampling the received signal, but the resulting statistics depends on the exact point in the received pulse waveform at which a sample is taken. Therefore, meaningful measurements require either deliberate oversampling, or alternatively accurate clock recovery with both the phase and frequency being locked, typically with a phase-locked. loop.

A second method involves the use of digital signal processor (DSP) based adaptive equalizers. These equalizers have the advantage of using closed-form algorithms and well-known architectures that have been extensively studied in the literature. However, in order to converge, all these equalizers require that the receiver sampling rate eventually locks to a frequency which is $(N/M)*$ receive baud rate, where N and M are known integers and $N \geq M$. If N=M, then baud-rate sampling is said to be employed, and the receiver sampling clock is frequency locked to the transmitter clock. Baud-rate sampled equalizers are also notoriously sensitive to the phase of the recovered clock, and thus require the receiver to implement a complete phase-locked-loop. If N>M, then the equalizer is a fractionally-spaced equalizer, which has also been extensively analyzed in the literature. Fractionally-spaced equalizers are insensitive to phase, but do require correct frequency-locking in the receiver. Thus, these algorithms also require a recovered clock that is at least frequency locked for proper operation. Unfortunately, it may be difficult to provide for robust joint convergence of all the control loops running in a typical transceiver (clock recovery, AGC, equalizer and offset control). Furthermore, it may be inconvenient to partition the integrated circuits (IC's) involved in such a way that the recovered clock is always available to the equalizer.

A third method for adaptation monitors the output of the equalizer decision circuit for the occurrence of specific data patterns. When these patterns are deemed to have occurred, corresponding digital samples (a time domain "snapshot") from the input to the decision circuit are then analyzed. The algorithm assumes the decisions are correct and that any deviations in the incoming waveform from an ideal waveform are due to errors in whatever parameters are being (jointly) controlled (AGC, equalizer, offset, etc.). For instance, if the equalizer were the only loop running (AGC and offset are correct), then the algorithm would assume that any deviations were due to intersymbol interference (ISI). For pulse amplitude modulation (PAM) systems, slow rise time and/or undershoot would be taken as a sign that the channel is under-equalized, while the presence of overshoot and/or ringing would presumably be because of over-equalization. The prior art has utilized algorithms which presume that the decision circuit (input to the pattern recognition block) always makes correct decisions; thus, the equalizer circuit will not converge until the sample clock is correctly phase-locked to the incoming data stream and frequency locked to M*receive baud rate, where M is a known integer $\geq 1$. For this purpose, a phase-locked loop may be provided to obtain a clock signal that is recovered from the received pulses; i.e., a "recovered clock".

If the equalizer sample clock is not the same as the recovered clock used for final data detection, then prior implementations of this third method have been unreliable. They are unreliable because their fine tune mechanism blindly assumes that data decisions derived from the samples input to the algorithm are mostly correct (i.e., produce a low bit error rate), and that the algorithm can in fact recognize when certain data patterns have occurred and analyze the corresponding ISI. This is despite the fact that the prior art techniques do not prevent many common scenarios which might cause the phase of the sample clock relative to the true receive data to be such that it is impossible to use the samples for reliable data recovery for indefinitely long periods of time. Thus, prior art techniques cannot guarantee that the equalizer sample clock will provide good samples (low bit error rate) for a long enough period of time within any randomly chosen acquisition window to guarantee that the equalizer will in fact converge within that window.

SUMMARY OF THE INVENTION

We have invented a equalization technique whereby a clock that has a frequency different that the incoming data frequency and not derived from the incoming pulses, referred to as an "asynchronous sampling clock", is used to sample the incoming data. At least one comparator is used to detect data pulses, and one or more additional comparators may be activated to provide information about the data, typically including overshoot and/or undershoot. This information is used to equalize a data channel. Additional information may be obtained for AGC and DC offset compensation, if desired.

DETAILED DESCRIPTION OF THE INVENTION

Figure 1:
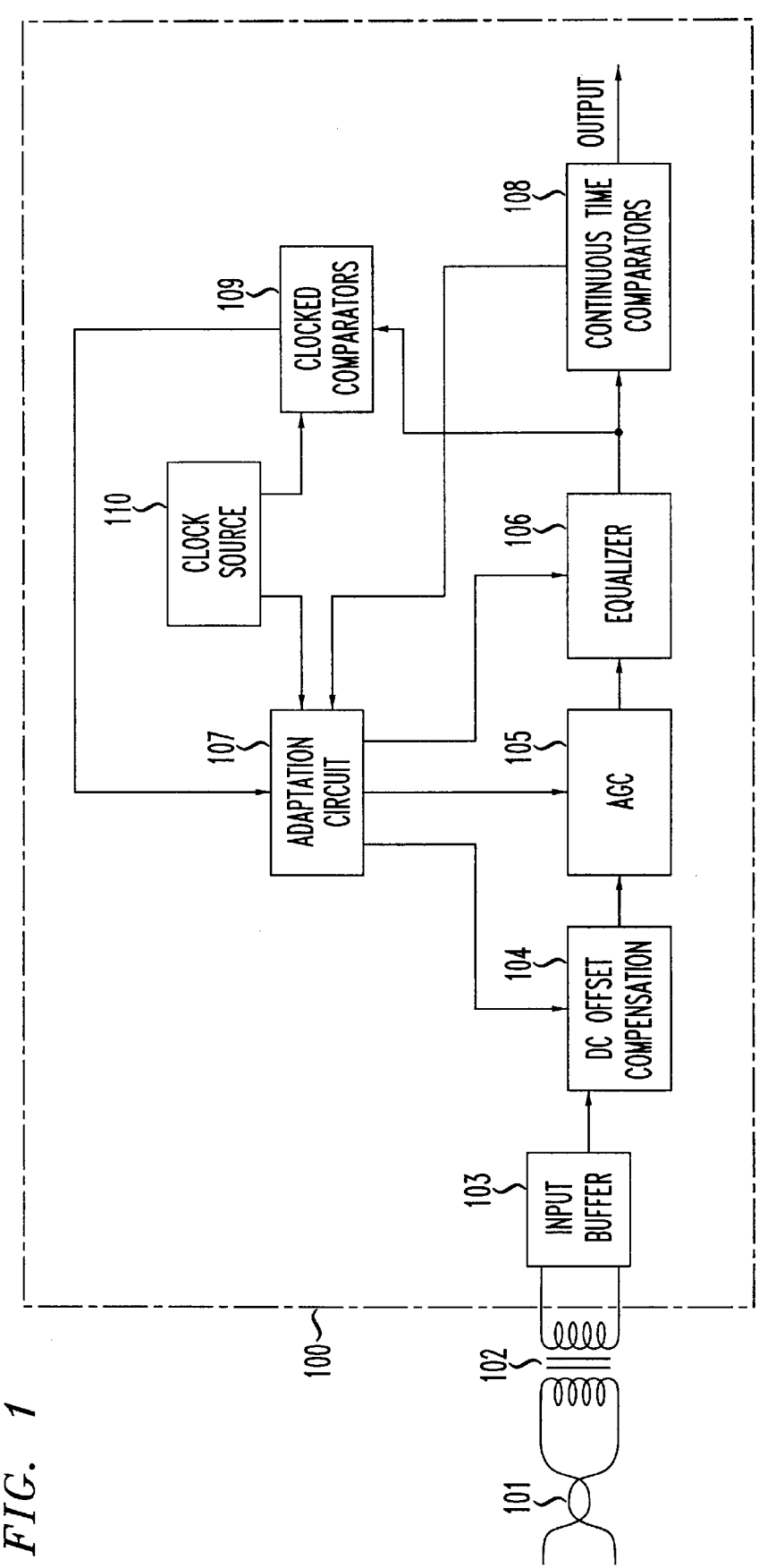
FIG. 1 shows an illustrative receiver equalization circuit that utilizes the inventive technique.

The following detailed description relates to an integrated circuit (IC) utilizing an asynchronous adaptation technique. As used herein, "asynchronous" implies that the receiver sampling clock is neither phase locked nor frequency locked to the transmitter clock. That is, the present technique allows an adaptation algorithm to work without any form of receiver clock recovery, so that the sampling clock is independent of the received pulse rate, and hence independent of the transmitter clock. In addition, the invention utilizes a sampling clock which is deliberately frequency offset from the true receive baud rate, but whose precise phase and center frequency need not be known. That is, the nominal receiver sampling clock frequency is different than the nominal transmitter clock frequency that is used to time the transmitted pulses. The fact that the equalizer convergence is now independent of clock recovery simplifies the design and cost of the receiver. It allows greater flexibility in chip partitioning, since the transceiver need not have access to a recovered clock, and it also improves the reliability of the system.

In practice, it is often difficult to prove the robustness (universal convergence) of systems which have multiple simultaneous control loops running if these control loops are all interrelated and dependent on each other for global convergence. For instance, a 100BaseTx LAN transceiver may have 4 control loops running: AGC, offset, equalizer and clock recovery. So the fact that clock recovery at least is decoupled from the other control loops leads to a system that is easier to make robust. The adaptation algorithm used with the inventive technique needs only data collected during certain windows of time, those windows being determined by a pattern recognition circuit whose input is the output of the decision circuit. The frequency offset of the sample clock relative to the incoming waveform is set high enough that algorithm can analyze snapshots of data taken over many cycles of the beat frequency and still meet acquisition time limits. The algorithm attempts to recognize when the sample timing is bad and to discard information collected in those windows. The algorithm averages what it considers is good data15 collected over many cycles of the beat period. Because there is now a lower bound to the beat frequency between the sample clock and true receive data based rate, the algorithm has sufficient valid input data during acquisition for it to meet acquisition time limits. That is, this system is more reliable than a prior-art system which does not provide this lower bound. For instance, a prior-art non-loop-timed system such as 100BaseT, in which the equalizer uses the local transmit clock for sampling, may have a receiver sampling clock that differs from the transmitter clock by an amount in the range of ±100 parts per million (ppm). This amount represents a typical variation in clocks derived from crystal oscillators having nominally the same frequency. As was pointed out before, that type of receiver cannot guarantee convergence, since a non-zero but "very low" beat frequency will necessarily cause the sample clock to spend "very long" periods with a bad phase relationship to the incoming data.

Referring to FIG. 1, in an exemplary embodiment an integrated circuit 100 includes a transceiver having an adaptive equalization circuit that utilizes the inventive technique. A communications channel includes a twisted-pair cable 101 the connects to terminals on one side of a transformer 102 that is typically located externally to the integrated circuit 100. The terminals on the other side of the transformer 102 connect to an input buffer 103, which may be of conventional design and which provides a transformation between the balanced transformer and the single-ended circuitry on the IC. Alternatively, a buffer having balanced inputs and outputs may be used if the IC uses balanced circuitry internally. The received data input signal is provided by the buffer 103 to the offset compensation circuit 104, which provides for correction of the differential offset in the comparators discussed below. The output of the compensation circuit is provided to the input of the automatic gain control (AGC) circuit 105, the output of which is provided to the input of equalizer 106. Note that the circuits 104, 105 and 106 are controlled by the adaptation circuit 107, which provides the proper control signals to adjust the offset compensation, gain, and equalization, respectively. The adaptation circuit 107 operates under the control of the continuous time comparators 108 and the asynchronous clocked comparators 109, discussed below.

Figure 2:
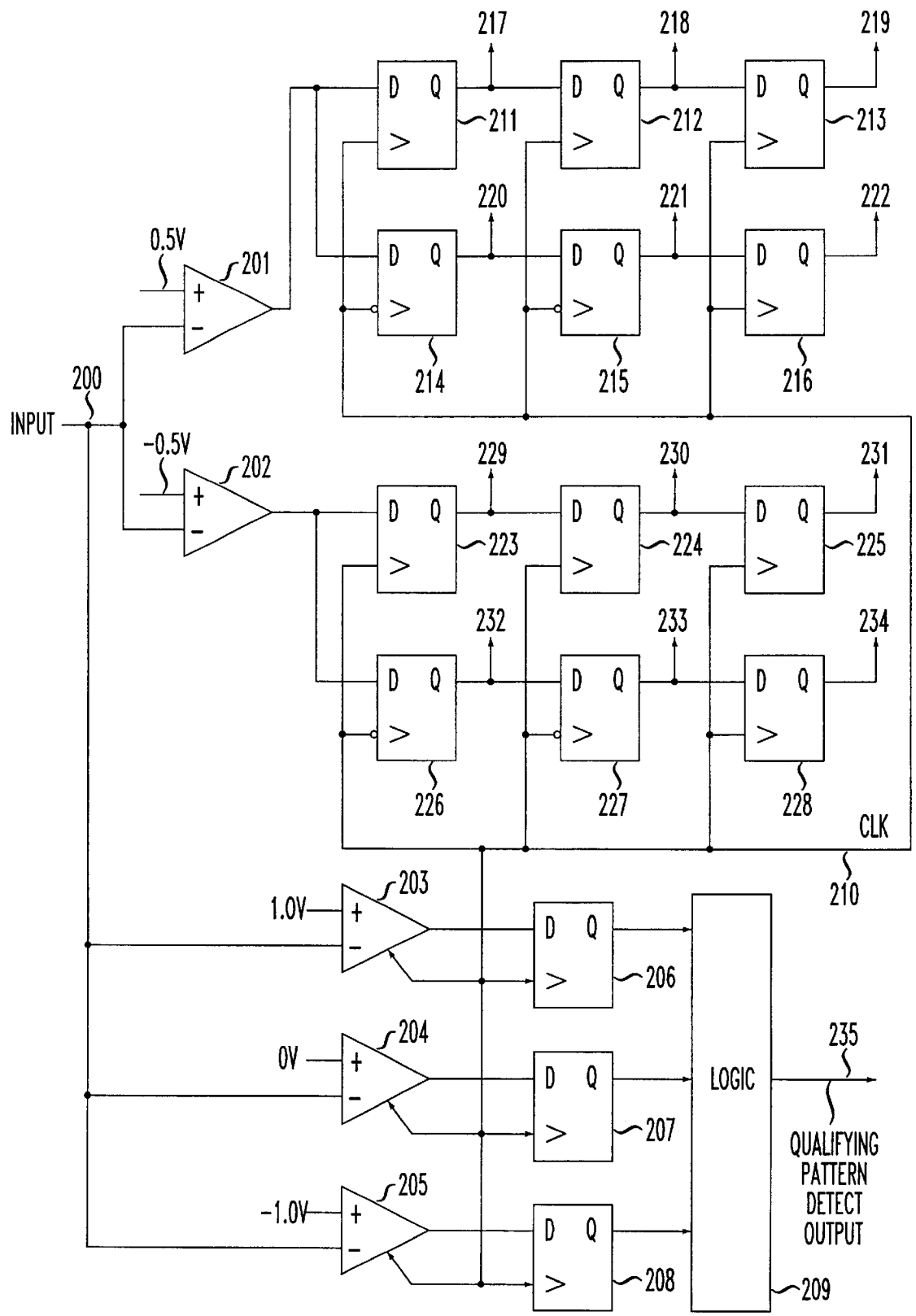
FIG. 2 shows an embodiment of circuitry suitable for implementing the inventive technique.

Referring to FIG. 2, an embodiment illustrating the use of asynchronous clocked comparator circuitry is shown. An input signal applied to input node 200 is coupled to the inputs of continuous time comparators 201 and 202, as well as to the inputs of clocked comparators 203, 204 and 205. The clock signal (CLK) applied to clock line 210 is at a frequency different than the frequency of the incoming data pulses on input node 200. For example, an incoming pulse rate of 125 megabits per second (Mb/s) is used in 100Base-TX systems to provide an effective data rate of 100 Mb/s, since the data is encoded using a 4B5 encoding scheme at the transmitter. In that case, a clock signal (CLK on line 210) frequency of approximately 123 Mb/s has been found suitable for practicing the present invention. This represents a clock signal having a frequency difference of about 1 percent from that of the incoming pulse rate, but with other differences being possible. CLK is also applied to the clock inputs of the D-Q flip-flops 206 to 216 associated with comparator 201; flip-flops 211, 212, 213 and 216 trigger on the positive clock edge, but note that the inputs of 214 and 215 are inverted in this illustrative embodiment, so they trigger on the negative clock edge. The use of both positive and negative clock edges for sampling effectively doubles the frequency of the sampling clock as compared to the frequency of CLK itself.

The output of comparator 201 is applied to the D inputs of 211 and 214, whose Q outputs are applied to the D inputs of 212 and 215, respectively. The Q outputs of 212 and 215 are applied to the D inputs of 213 and 216, respectively. In operation, the comparator 201 supplies a high output voltage when the incoming pulses on node 200 rise above 0.5 volts. This is indicated by a high voltage on the Q outputs 217, 218 and 219 when node 200 remains above 0.5 volts for three successive positive clock edges. Similarly, the Q outputs 220, 221 and 222 provide a high voltage when the node 200 remains above 0.5 volts for two successive negative clock edges followed by a positive clock edge. These outputs (217 to 222) are supplied to the adaptation circuit 107 in FIG. 1, and indicate that the pulse is in fact positive (i.e., above a noise floor level), and capable of being further analyzed with the aid of the clocked comparator 203 and associated circuitry discussed below. The comparator 202 and associated flip-flops (223 to 228) perform a similar function with regard to negative pulses. That is, the output of comparator 202 goes high when the input on node 200 goes below 0.5 volts, and thereafter a succession of clock pulse edges cause the outputs 229 to 234 to go high. These outputs are also supplied to the adaptation circuit 107, indicating that the pulse is capable of being further analyzed with the aid of the clocked comparator 205 and associated logic circuitry discussed below.

The clocked comparator 203 determines whether the input pulse voltage level is above 1.0 volts, in which case it supplies a high level to the D input of flip-flop 206. Therefore, each time a positive edge of the CLK signal on line 210 occurs and the input pulse voltage at node 200 is greater than 1.0 volts, a positive voltage from the Q output of flip-flop 206 is applied to an input of logic block 209. The logic block 209 serves as a filter to eliminate various high-frequency transitions, for example 010, and may be implemented using designs known in the art for this purpose. This filtering action allows the more useful data patterns to be applied to the "qualifying pattern detect" output line 235, which connects to an input of the adaption circuit (107 in FIG. 1). The adaption circuit provides a statistical analysis of the qualifying pattern detect data when the presence of a positive pulse greater than 0.5 volts has been determined by an analysis of the information on the flip-flop. output lines 217 to 222 as noted above. For example, in an illustrative embodiment, the adaptation circuit analyzes 40 data samples in order to provide the appropriate correction signal to the equalizer (106) circuit.

Figure 3:
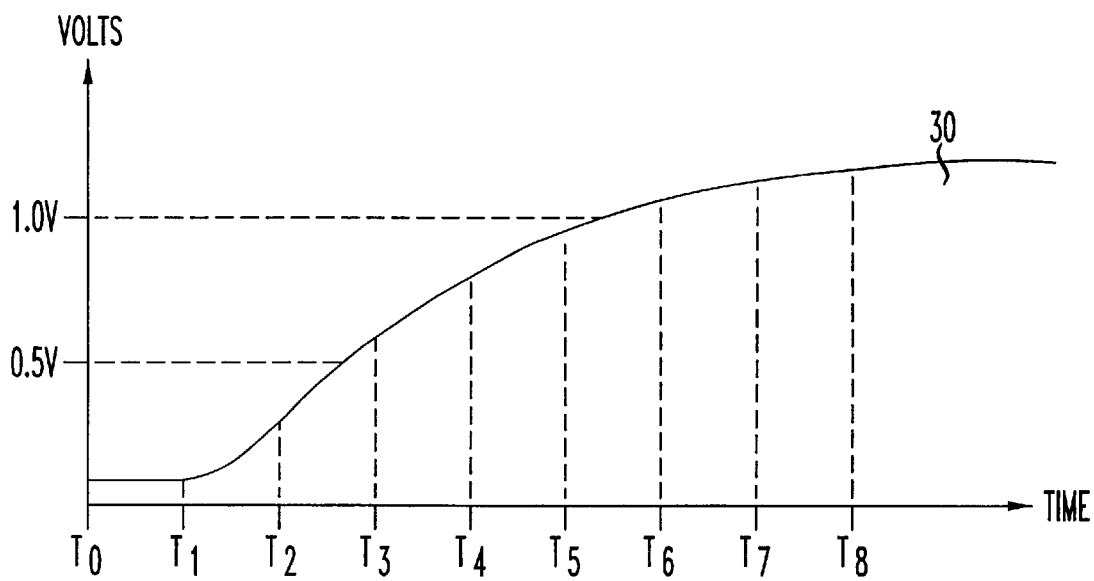
FIG. 3 shows a waveform having undershoot that is detected by the inventive technique.
Figure 4:
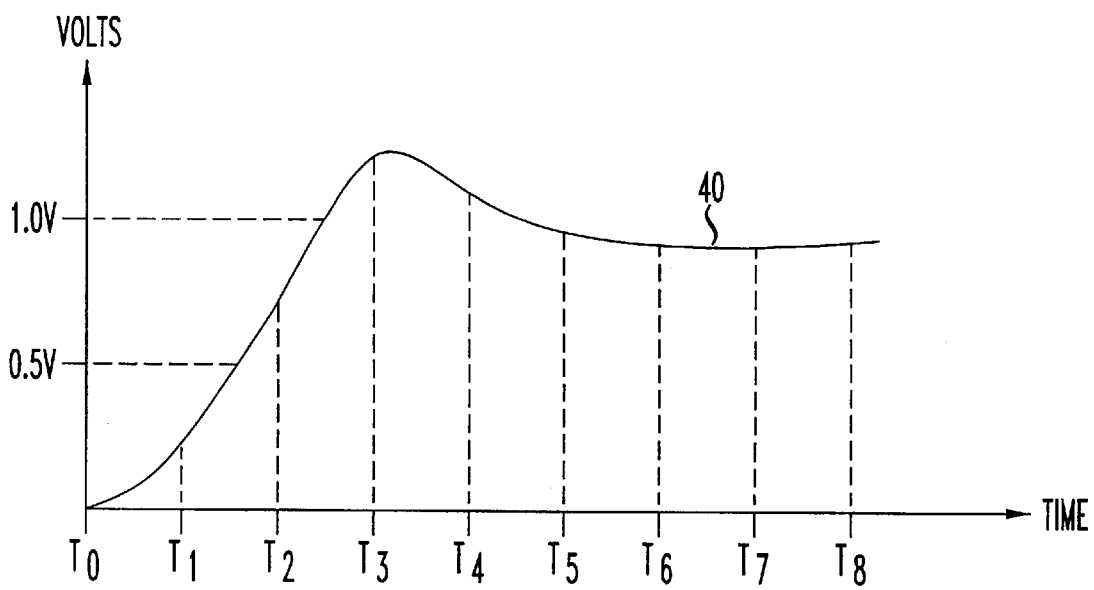
FIG. 4 shows a waveform having overshoot that is detected by the inventive technique.

Illustrative examples of input voltage pulse waveforms that exhibit undershoot and overshoot are given in FIGS. 3 and 4, respectively. The times T0 through T8 represent the times of the positive edges of the CLK signal on line 210. Referring to FIG. 3, a waveform 30 initially has a value of 0 volts at time T0, and remains below 0.5 volts through time T2, rising to above the 0.5 volt level by T3. Therefore, at time T3 and at subsequent times, the output of the comparator 201 is high, thereby placing a high level on flip-flop output lines 217 to 219 after three clock cycles on CLK line 210, as discussed above. This action indicates that the input voltage on node 200 is high enough to represent a valid high voltage pulse level, as contrasted to a noise voltage or a zero voltage pulse level, for example. An additional series of comparisons is then initiated to determine whether the high pulse level is above or below the nominal high voltage pulse level, being 1.0 volts in the illustrative case. For example, at times T3, T4 and T5, the voltage level of waveform 30 is less than 1.0 volts, and so the comparator 203 supplies a low voltage level to the flip-flop 206 on each clock edge. At times T6, T7 and T8, the voltage level of waveform 30 is greater than 1.0 volts, and so the comparator 203 supplies a high voltage level to the flip-flop 206 on each clock edge. Therefore, the qualifying pattern output line 235 supplies low voltage signals to the adaptation circuit 107 from times T0 to T5, and high voltage signals from T6 through T8.

A similar analysis may be performed on the waveform 40 shown in FIG. 4. That is, the voltage is initially low, approximately zero volts, at T0, and remains below 0.5 volts at T1. Thereafter, it rapidly rises above 0.5 volts, and remains above 0.5 volts for all subsequent times shown (T2 through T8). Therefore, the comparator 201 and associated flip-flops will indicate to the adaptation circuit 107 that a valid high voltage pulse level exists. Furthermore, the voltage rises to above 1.0 volts at T3, and remains above 1.0 volts at times T4, but falls below 1.0 volts for times T5 through T8. Therefore, the qualifying pattern output line 235 supplies high voltage signals to the adaptation circuit 107 for times T3 and T4, and low voltage signals from T5 through T8.

The foregoing description has illustrated the present technique in terms of positive pulses, but the negative-voltage comparators (202, 205) and associated circuitry may be used to perform a similar analysis on negative pulses (i.e., less than 0 volts). Note that a 0 volt comparator (204) is also shown in FIG. 2, and provides information useful for analyzing a +1 to 0 transition, as well as for a −1 to 0 transition used in a tri-level coding scheme. Such information is useful for both equalization and DC offset purposes. The above embodiment therefore illustrates use of the present invention for a tri-level coding scheme with −1, 0 and +1 logic levels, but use with other coding schemes is possible. For example, more comparators may be used if more information is desired for multi-level coding schemes having more than three levels. Alternatively, if a binary coding scheme is used, fewer comparators than those shown above may be sufficient to obtain the desired information.

The information supplied to the adaptation circuit resulting from the above-noted comparisons may be used to determine the presence of overshoot or undershoot, for example, which information may be used to adjust the equalizer 106. The information may also be used to adjust the overall gain of the receiver by means of the AGC circuit 105. The information may also be used to adjust the direct current (DC) level of the signal by the offset compensation circuit 104. Each of these circuits may be constructed according to designs known in the data receiver art, if desired. It can be seen that the present technique makes use of a clock signal that is asynchronous to the transmitter clock used to generate the data pattern that is received. Therefore, it is asynchronous to a recovered clock generated by a clock recovery circuit from the received data, if such a clock recovery circuit is present. The present approach to adaptation allows the equalizer to converge without any form of receiver clock recovery. Receiver clock recovery may still be needed, but it can be positioned after the equalizer. The clock recovery control loop as well as the final transceiver data decision circuit need not use the same samples used by the equalizer adaptation circuit, and the clock recovery control loop can converge independently of the equalizer once the equalizer has opened the eye some minimum amount.

The asynchronous sampling clock may be produced by a variety of sources (110) known in the art, most typically including a crystal oscillator having the desired frequency offset, or alternatively a frequency synthesizer that introduces the desired offset. The asynchronous sampling clock is typically designed for sampling the received pulses at a rate of from 0.1 percent to 25 percent different (i.e., offset either higher or lower) than twice the received pulse rate. Note that the illustrative asynchronous sampling clock achieves sampling at twice the rate of the CLK signal on line 210 by use of both the positive-going and negative-going clock edges.

We claim:

1. A data receiver having an equalizer and adapted to receive data pulses generated in accordance with a transmitter clock, comprising:

comparator circuitry having a first comparator with a first threshold for data detection; and an adaptation circuit configured to control said equalizer with an asynchronous clock derivable from a source independent of, and frequency offset to, said transmitter clock, said adaptation circuit configured to control said equalizer in response to said first comparator.

2. The data receiver as recited in claim 1 wherein said comparator circuitry further comprises a second comparator having a second threshold greater than said first threshold and configured to determine whether said data pulses overshoot or undershoot a desired value.

3. The data receiver as recited in claim 1 further comprising an automatic gain control circuit controllable by said adaptation circuit.

4. The data receiver as recited in claim 1 further comprising a DC offset compensation circuit controllable by said adaptation circuit.

5. A method of operating a data receiver having an equalizer and adapted to receive data pulses generated in accordance with a transmitter clock, comprising:

comparing a value associated with said data pulses to a first threshold and providing an output signal therefrom; and controlling said equalizer with an asynchronous clock derived from a source independent of, and frequency offset to, said transmitter clock and as a function of said output signal.

6. The method as recited in claim 5 further comprising comparing said value associated with said data pulses to a second threshold greater than said first threshold to determine whether said data pulses overshoot or undershoot a desired value.

7. The method as recited in claim 5 wherein said controlling further comprises controlling an automatic gain control circuit and DC offset compensation circuit.

8. A data receiver having an equalizer and adapted to receive data pulses generated in accordance with a transmitter clock, comprising:

an adaptation circuit configured to control said equalizer with an asynchronous clock derivable from a source independent of, and frequency offset to, said transmitter clock, said asynchronous clock configured to provide a sampling rate in the range of 0.1 to 25 percent of twice a data rate associated with said data pulses.

9. The data receiver as recited in claim 8 further comprising comparator circuitry including a first comparator and a second comparator.

10. The data receiver as recited in claim 8 further comprising an automatic gain control circuit and DC offset compensation circuit controllable by said adaptation circuit.

11. A method of operating a data receiver having an equalizer and adapted to receive data pulses generated in accordance with a transmitter clock, comprising:

controlling said equalizer with an asynchronous clock derived from a source independent of, and frequency offset to, said transmitter clock; and providing a sampling rate in the range of 0.1 to 25 percent of twice a data rate associated with said data pulses with said asynchronous clock.

12. The method as recited in claim 11, further comprising:

comparing a value associated with said data pulses to a first threshold and providing an output signal therefrom; and comparing said value associated with said data pulses to a second threshold greater than said first threshold to determine whether said data pulses overshoot or undershoot a desired value, said controlling further employing said output signal to control said equalizer.

13. The method as recited in claim 11 further comprising controlling an automatic gain control circuit and DC offset compensation circuit.

14. A data receiver adapted to receive data pulses generated in accordance with a transmitter clock operating at a first frequency, comprising:

an equalizer;

an adaptation circuit configured to control said equalizer in accordance with an asynchronous receiver clock that samples said data pulses at a second frequency that varies from said first frequency; and comparator circuitry, including:
      a first comparator having a first threshold for data detection of said data pulses, and
      a second comparator having a second threshold greater than said first threshold for determining whether said data pulses overshoot or undershoot a desired value.

15. The data receiver as recited in claim 14 further comprising an automatic gain control circuit and DC offset compensation circuit controllable by said adaptation circuit.

16. A method of operating a data receiver adapted to receive data pulses generated in accordance with a transmitter clock operating at a first frequency, comprising:

providing an equalizer;

comparing a value associated with said data pulses to a first threshold and providing an output signal therefrom;

controlling said equalizer by sampling said data pulses with an asynchronous receiver clock operating at a second frequency that varies from said first frequency and as a function of said output signal; and comparing said value associated with said data pulses to a second threshold greater than said first threshold to determine whether said data pulses overshoot or undershoot a desired value.

17. The method as recited in claim 16 wherein said controlling further comprises controlling an automatic gain control circuit and DC offset compensation circuit.

* * * * *